US012652578B2

(12) United States Patent
Szigeti et al.

(10) Patent No.: US 12,652,578 B2
(45) Date of Patent: Jun. 9, 2026

(54) PREVENTING SERVICE INTERRUPTIONS BY PREDICTING OUTAGES IN A SATELLITE NETWORK

(71) Applicant: Cisco Technology, Inc., San Jose, CA (US)

(72) Inventors: Thomas Szigeti, Vancouver (CA); David John Zacks, Vancouver (CA); Jeff Apcar, Willoughby (AU); Robert Edgar Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 375 days.

(21) Appl. No.: 18/104,081

(22) Filed: Jan. 31, 2023

(65) Prior Publication Data

US 2024/0259875 A1     Aug. 1, 2024

(51) Int. Cl.
  *H04W 28/08*     (2023.01)
  *H04W 16/22*     (2009.01)
  *H04W 76/18*     (2018.01)

(52) U.S. Cl.
  CPC ....... *H04W 28/0942* (2020.05); *H04W 16/22* (2013.01); *H04W 76/18* (2018.02)

(58) Field of Classification Search
  CPC . H04W 28/0942; H04W 76/18; H04W 16/22; H04W 16/14; H04W 24/04; H04W 24/02
  See application file for complete search history.

(56) References Cited

U.S. PATENT DOCUMENTS

| | | | |
|---|---|---|---|
| 6,070,073 A | 5/2000 | Maveddat et al. | |
| 9,297,723 B1 | 3/2016 | Hofmann et al. | |
| 11,044,008 B2 * | 6/2021 | Ravishankar | ...... H04B 7/18541 |
| 2016/0198152 A1 * | 7/2016 | Chin | ................. H04N 21/6143 |
| | | | 725/107 |
| 2021/0399972 A1 | 12/2021 | Nguyen et al. | |
| 2022/0209876 A1 | 6/2022 | Sitaram et al. | |
| 2022/0239367 A1 * | 7/2022 | Mayer | ................... H04W 24/02 |
| 2022/0360323 A1 * | 11/2022 | Dooling | ............ H04B 7/18519 |
| 2023/0388774 A1 * | 11/2023 | Vivanco | ................. H04W 8/10 |
| 2024/0172302 A1 * | 5/2024 | Rakshit | .................. H04W 4/44 |
| 2024/0187090 A1 * | 6/2024 | Wu | .................... H04B 7/18545 |

OTHER PUBLICATIONS

Hassanien, et al., "Machine Learning in Telemetry Data Mining of Space Mission: Basics, Challenging and Future Directions," Artificial Intelligence Review, SpringerLink, Sep. 4, 2019, 30 pages.

* cited by examiner

*Primary Examiner* — Rasheed Gidado

(74) *Attorney, Agent, or Firm* — Lee & Hayes, P.C.

(57)     ABSTRACT

This disclosure describes techniques for predicting and accommodating for outages in a satellite network using crowdsourced data. An example method includes receiving outage data indicating first outages experienced by first endpoints in a first geographical region. The first outages, for instance, include interruptions in communication between first satellites and the first endpoints. The example method further includes predicting, based on the outage data, a second outage comprising an interruption in communication between at least one second satellite and a second endpoint in a second geographical region. Further, the example method includes causing the second endpoint to transmit user data over a secondary network in advance of the second outage.

20 Claims, 5 Drawing Sheets

400

RECEIVE OUTAGE DATA INDICATING FIRST OUTAGES BETWEEN FIRST ENDPOINTS IN A FIRST GEOGRAPHICAL REGION AND A SATELLITE NETWORK
402

PREDICT, BASED ON THE OUTAGE DATA, A SECOND OUTAGE TO BE EXPERIENCED BY A SECOND ENDPOINT IN A SECOND GEOGRAPHICAL REGION AND THE SATELLITE NETWORK 404

CAUSE THE DATA TRAFFIC TO AND/OR FROM THE SECOND ENDPOINT TO BE TRANSMITTED OVER A TERRESTRIAL NETWORK IN ADVANCE OF THE SECOND OUTAGE
406

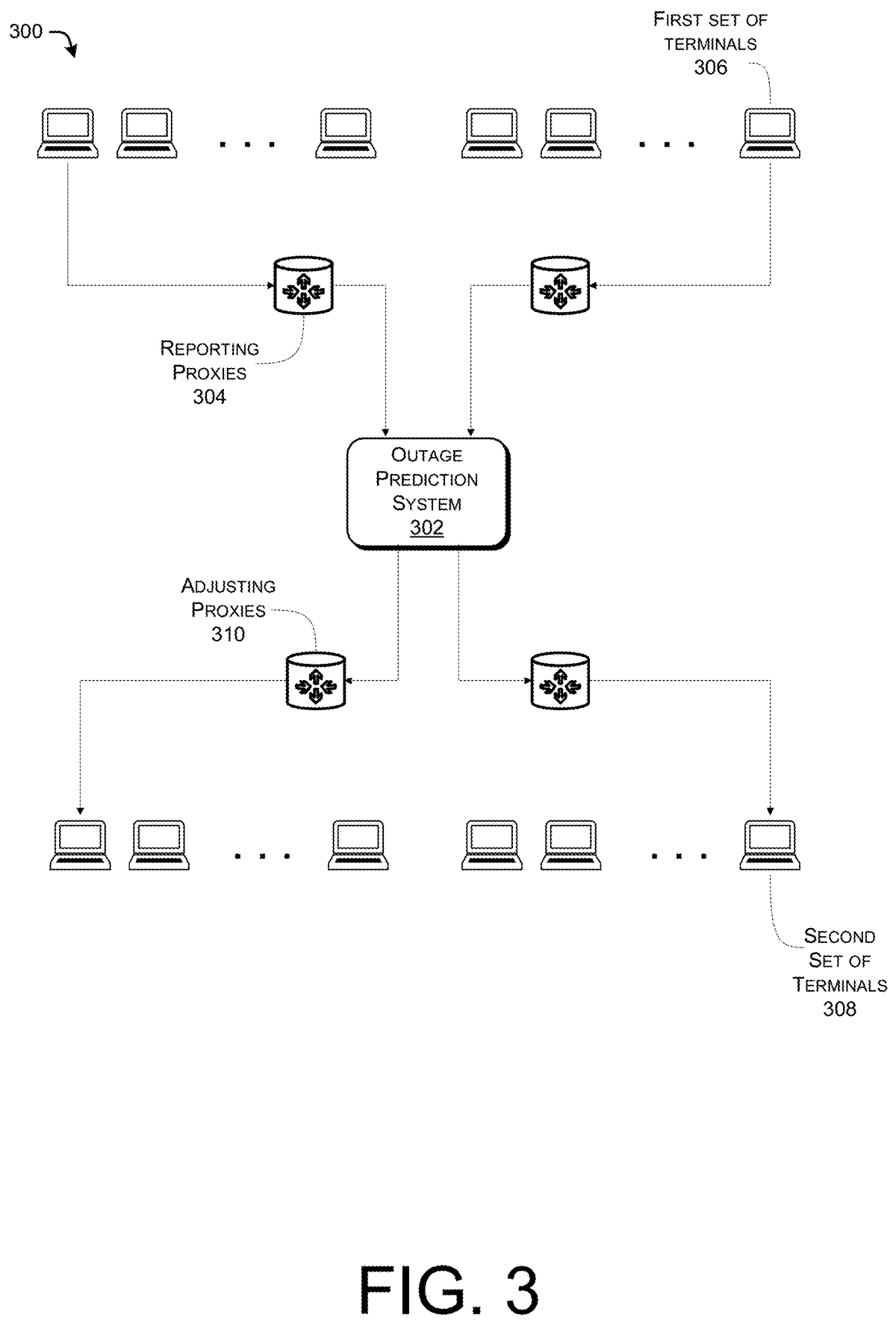

FIRST SET OF
TERMINALS
306

REPORTING
PROXIES
304

OUTAGE
PREDICTION
SYSTEM
302

ADJUSTING
PROXIES
310

SECOND
SET OF
TERMINALS
308

FIG. 3

400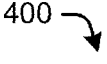

RECEIVE OUTAGE DATA INDICATING FIRST OUTAGES
BETWEEN FIRST ENDPOINTS IN A FIRST GEOGRAPHICAL
REGION AND A SATELLITE NETWORK
402

PREDICT, BASED ON THE OUTAGE DATA, A SECOND OUTAGE
TO BE EXPERIENCED BY A SECOND ENDPOINT IN A SECOND
GEOGRAPHICAL REGION AND THE SATELLITE NETWORK 404

CAUSE THE DATA TRAFFIC TO AND/OR FROM THE SECOND
ENDPOINT TO BE TRANSMITTED OVER A TERRESTRIAL
NETWORK IN ADVANCE OF THE SECOND OUTAGE
406

FIG. 4

PREVENTING SERVICE INTERRUPTIONS BY PREDICTING OUTAGES IN A SATELLITE NETWORK

TECHNICAL FIELD

The present disclosure relates generally to predicting outages in a satellite network and taking remedial actions to prevent service interruptions in advance of the predicted outages.

BACKGROUND

Modern communication networks are designed to transmit data between various endpoints connected to the networks. Examples of popular communication networks include cellular networks, such as networks operating in accordance with $3^{rd}$ Generation Partnership Program (3GPP) standards. These networks include, for instance, New Radio (NR) and Long Term Evolution (LTE) networks.

Recently, there has been increased interest in implementing communication networks that utilize artificial satellites orbiting the earth. These networks may have improved latency and/or coverage, when compared to existing communication networks. In particular, there is increasing interest in implementing communication networks that utilize low earth orbit (LEO) satellites, which are disposed at a height of about 100 to 2,000 kilometers (km) above the earth. LEO satellites can communicate with devices disposed on the surface of the earth via radio frequency (RF) signaling. In some examples, a device at one location on the surface of the earth can communicate with another device at another location on the surface of the earth by transmitting data to a satellite in a satellite network. The data, for instance, can be relayed to the other device along a path of one or more communicatively coupled satellites in the satellite network. In various examples, satellite networks are not necessarily limited to stationary, terrestrial base stations for operation.

Large-scale deployments of satellite networks, however, face certain challenges. Satellite networks can suffer from outages when communications between ground stations and satellites are blocked. For example, a cloud intersecting a communication path between a ground station and a satellite can prevent them from reliably exchanging RF signals. For applications where high reliability is preferred, these outages can prevent widespread adoption of communication over satellite networks.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2 illustrates an example environment including a grid of geographic regions whose satellite network outages can be predicted in advance.

FIG. 3 illustrates an example environment for predicting future satellite network outages based on previous satellite network outages.

FIG. 4 illustrates an example process for preventing serve interruptions in advance of satellite network outages.

DESCRIPTION OF EXAMPLE EMBODIMENTS

Overview

Figure 1:
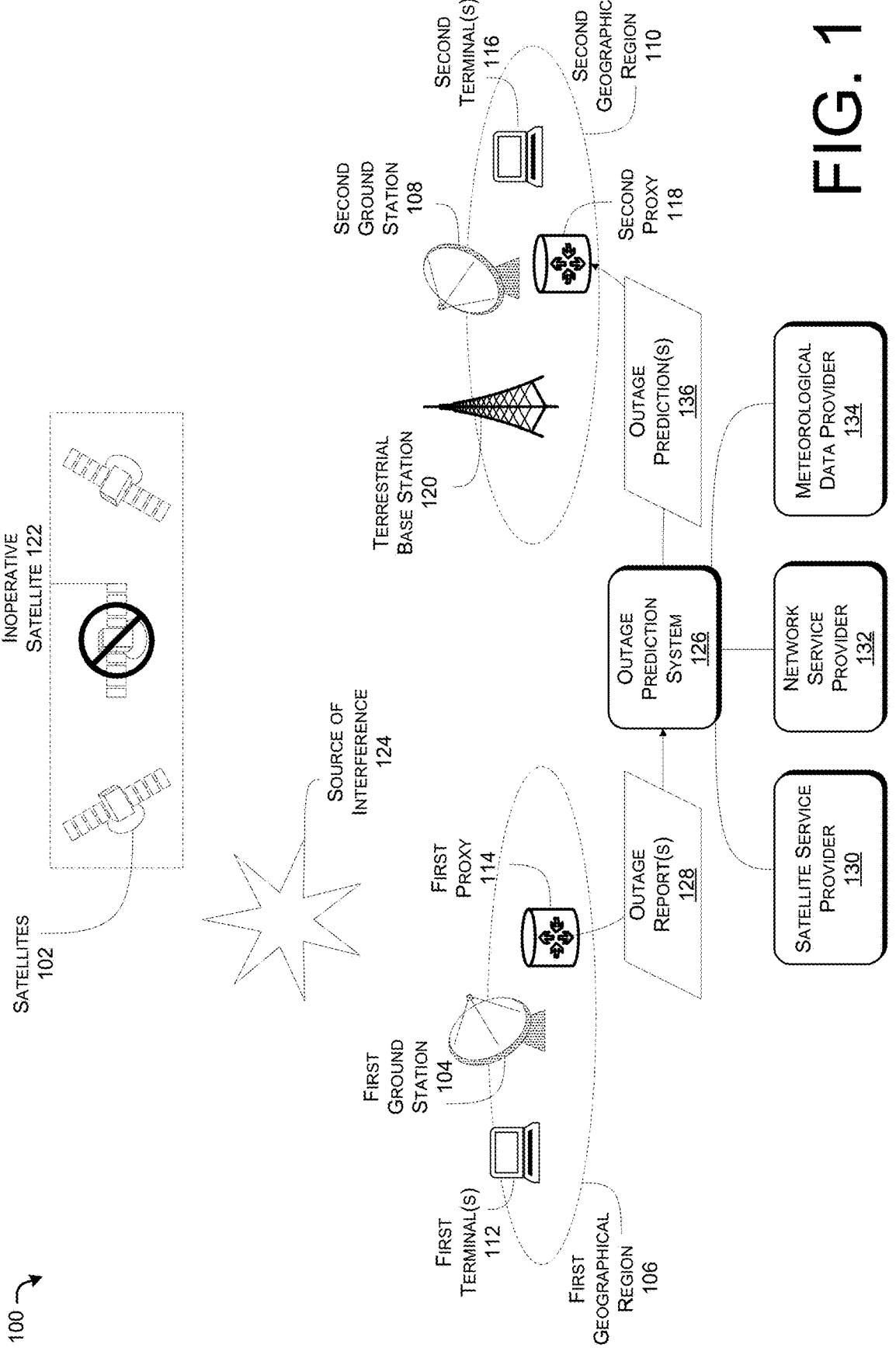
FIG. 1 illustrates an example environment for preventing interruptions in services for devices connected to a satellite network.

This disclosure describes various techniques for predicting outages in a satellite network and performing remedial actions (e.g., routing, notifications, etc.) to prevent the predicted outages from reducing a user's experience.

An example method includes receiving outage data indicating first outages experienced by first endpoints in a first geographical region, the first outages including interruptions in communication between first satellites and the first endpoints; predicting, based on the outage data, a second outage including an interruption in communication between at least one second satellite and a second endpoint in a second geographical region; and causing the second endpoint to transmit user data over a secondary network in advance of the second outage.

In some implementations, the outage data is received from at least one proxy connected to the first endpoints. In some examples, the outage data includes locations of the first endpoints during the first outages, times of the first outages, and durations of the first outages.

According to various implementations, the first satellites may include at least one Low Earth Orbit (LEO) satellite.

In various instances, predicting the second outage includes training a machine learning model using the outage data; and in response to training the machine learning model, predicting the second outage based on the machine learning model.

According to some examples, predicting the second outage is further based on at least one of: meteorological data; or radio frequency (RF) interference data.

In various cases, the secondary network includes a terrestrial network. In some instances, causing the second endpoint to transmit user data over the secondary network in advance of the second outage includes transmitting, to a proxy connected to the second endpoint, an instruction to transmit the user data to the terrestrial network.

Example Embodiments

Various implementations of the present disclosure will be described in detail with reference to the drawings, wherein like reference numerals present like parts and assemblies throughout the several views. Additionally, any samples set forth in this specification are not intended to be limiting and merely demonstrate some of the many possible implementations.

FIG. 1 illustrates an example environment 100 for preventing interruptions in services for devices connected to a satellite network.

The environment 100 includes a satellite network. The satellite network may include various satellites 102 orbiting the earth. As used herein, the term "satellite," and its equivalents, refers to a computing device that is orbiting the earth. Each one of the satellites 102 may transmit communication signals into an associated coverage region, and may receive communication signals from other devices within the coverage region. Because the satellites 102 move over time, their respective coverage regions also move over time. The satellites 102, for instance, are nodes within the satellite network. In various cases, the satellites 102 include one or more LEO satellites.

The satellites 102 may be configured to exchange communication signals with various ground stations disposed on the earth's surface. As used herein, the term "ground station," and its equivalents, refers to a terrestrial device that is configured to transmit communication signals to one or more satellites and to receive communication signals from one or more satellites. In various implementations, the satellites 102 and the ground stations exchange communication signals that are electromagnetic (EM) signals within the RF range. These communication signals may encode various data, such as user data. For instance, a first ground station 104 is located in a first geographical region 106 and a second ground station 108 is located in a second geographical region 110.

The first ground station 104 is communicatively coupled with at least one first terminal 112 in the first geographical region 106. The first terminal(s) 112 may include one or more computing devices. As used herein, the terms "UE," "user device," "wireless communication device," "communication device," "mobile device," "client device," and "terminal" can be used interchangeably herein to describe any UE that is capable of transmitting/receiving data (e.g., wirelessly) using any suitable communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over Internet Protocol (IP) (VOIP), VOLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future IP-based network technology or evolution of an existing IP-based network technology. In general, a UE can be implemented as any suitable type of computing device configured to communicate over a wired or wireless network, including, without limitation, a mobile phone (e.g., a smart phone), a tablet computer, a laptop computer, a Portable Digital Assistant (PDA), a wearable computer (e.g., electronic/smart glasses, a smart watch, fitness trackers, etc.), an Internet-of-Things (IOT) device, an in-vehicle (e.g., in-car) computer, and/or any similar mobile device, as well as situated computing devices including, without limitation, a television (smart television), a Set-Top-Box (STB), a desktop computer, and the like.

As used herein, the terms "node," "network node," and their equivalents, can refer to any entity within a network that can transmit packets to and/or receive packets from at least one other node. The first terminal(s) 112 may be nodes within a network. A node may be a device, a software instance, a Virtual Machine (VM), a container, a virtual process, or the like. In some examples, a node may include a grouping of devices or virtual resources, such as security groups, subnetworks, and so forth. In some examples, a node can be a client, a server, or a combination thereof. In some cases, a node can be an endpoint of a flow, such as a source or a destination. In some cases, a node can be a network switch, network router, or the like.

The environment 100 further incudes a first proxy 114 that is communicatively coupled to the first ground station 104 and/or the first terminal(s) 112. As used herein, the term "proxy," and its equivalents, can refer to an entity configured to communicate over a LEO satellite network on behalf of a client device. In some cases, a proxy is inserted on, for example, a WAN router and/or ground station. Thus, a proxy, in various cases, can receive data traffic from and/or cause distribution of data traffic to one or more client devices. In various implementations, the first proxy 114 controls data traffic between to and from the first terminal(s) 112. In various cases, the first proxy 114 is connected to, or part of, the first ground station 104.

In addition, the second ground station 108 is communicatively coupled with at least one second terminal 116 in the second geographical region 110. The second terminal(s) 116 include one or more computing devices and may be nodes within the network. A second proxy 118 is communicatively coupled to the second ground station 108 and/or the second terminal(s) 116. In addition, the second proxy 118 may be communicatively coupled to a terrestrial base station 120. The terrestrial base station 120, in various cases, may be part of a terrestrial communication network that omits the satellites 102. For example, the terrestrial communication network may include a WI-FI network, a BLUETOOTH network, and/or a cellular network (e.g., a network defined according to the $3^{rd}$ Generation Partnership Project (3GPP), such as a $3^{rd}$ Generation (3G) network, a $4^{th}$ Generation (4G) network, or a $5^{th}$ Generation (5G) network). The second proxy 118 is configured to route data traffic between the second ground station 108, the second terminal(s) 116, and the terrestrial base station 120.

In various implementations, the first terminal(s) 112 and the second terminal(s) 116 are configured to transmit data to and/or receive data from the satellite network via the first ground station 104 and the second ground station 108. The data may be transmitted in one or more data packets. As used herein, the terms "packet," "data packet," and their equivalents, can refer to a unit of data that is transmitted between two nodes. In various examples, a packet may have a header, which may include control data, and a payload, which may include user data. The header may include information such as an identifier of the source of the packet, an identifier of the destination of the packet, an indication of the type of user data in the payload, or the like. In some cases, a packet can be defined by a particular networking protocol, such as IP, TCP, UDP, or another networking protocol. In some implementations, a packet can be an IPv4 packet, an IPv6 packet, or the like.

In various implementation, the satellite network including the satellites 102 is preferred for transmission of data to and from the second terminal(s) 116. For example, an overall latency of communications across the satellite network may be lower than a latency of communications across the terrestrial network. However, the satellite network may be prone to various outages that temporarily prevent the transmission of data across the satellite network.

Outages in the satellite network may have one or more various sources. In some cases, an outage can occur due to an inoperative satellite 122 among the satellites 102. For instance, the inoperative satellite 122 may be physically damaged in orbit and unable to receive and/or transmit communication signals. In some cases, the inoperative satellite 122 is engaging in a temporary software update that temporarily prevents the inoperative satellite 122 from transmitting and/or receiving communication signals. According to some implementations, if the second ground station 108 transmits a communication signal carrying user data from the second terminal(s) 116 to the inoperative satellite 122, the user data may be unable to reach its destination due to the incapability of the inoperative satellite 122 to receive or transmit communication signals.

In some implementations, a source of interference 124 prevents communication signals from reaching the satellites 102 or other destinations in the satellite network. The source of interference 124 could be weather-based. For instance, the source of interference 124 could include one or more clouds, storms, or other meteorological phenomena that block the transmission of communication signals. In some cases, the source of interference 124 includes electromagnetic interference, such as radiation caused by a solar flare. In some implementations, the source of interference 124 includes other wireless transmissions in an alternative communication network.

Notably, the inoperative satellite 122 and the source of interference 124 can move over time. For example, a coverage region of the inoperative satellite 122 may move from the first geographical region 106 to the second geographical region 110 as the inoperative satellite 122 travels along its orbit of the earth. Similarly, the source of interference 124 may move over time. For example, the source of the interference 124 may include a storm cloud that is disposed between the first geographical region 106 and the satellites 102 at a first time, and then is disposed between the second geographical region 110 and the satellites 102 at a second time. Due to the movement of the satellites 102 and/or the movement of the source of interference 124 over time, the outage patterns of the first geographical region 106 can be used to predict future outage patterns of the second geographical region 110.

In various implementations, an outage prediction system 126 is configured to predict outages in the satellite network before they occur. In particular cases, the outage prediction 126 is configured to predict a future outage affecting the second terminal(s) 116 in the second geographical region 110 based, at least in part, on a previous outage affecting the first terminal(s) 112 in the first geographical region 106.

In various cases, the first proxy 114 transmits one or more outage reports 128 to the outage prediction system 126. The outage report(s) 128 may indicate one or more outages experienced by the first terminal(s) 112. For instance, the outage report(s) 128 indicate at least one message that was not received by the first terminal(s) 112 from the satellites 102. In some cases, the first terminal(s) 112 detect that the message(s) are not received as part of a periodic ping operation between the first terminal(s) 112 and the satellites 102. For instance, a first terminal 112 may determine that the satellites 102 are unreachable if the first terminal 112 transmits a request toward the satellites 102 and does not receive a response to the request from the satellites 102 within a predetermined time period after sending the request. Like other types of data, the request and/or response may be routed through the first ground station 104. In some implementations, the first ground station 104 identifies an outage by transmitting a request toward the satellites 102 and determining that a response has not been received from the satellites 102 within a predetermined time period. The first terminal(s) 112 and/or the first ground station 104 may indicate the outages to the first proxy 114, which may generate the outage report(s) 128. In various cases, the outage report(s) 128 include a time and/or a duration of each outage detected by the first terminal(s) 112 and/or the first ground station 104. In some cases, the outage report(s) 128 further indicate a location of the entity detecting each outage. For instance, the outage report(s) 128 indicate the location of a first terminal 112 that has reported the outage. The first terminal 112, for instance, may identify and report its location using a global navigation satellite system (GNSS), such as the Global Positioning System (GPS), Galileo navigation satellite system, NavIC, or the BeiDou navigation satellite system. For instance, the first terminal 112 may determine its location based on signals it receives from satellites within the GNSS.

In some implementations, the outage prediction system 126 further receives and/or otherwise accesses other data relevant to the prediction of future outages. The outage prediction system 126 may receive data indicating information about the satellites 102 from a satellite service provider 130. For instance, the satellite service provider 130 may indicate that the inoperative satellite 122 is undergoing a software update that will temporarily prevent the inoperative satellite 122 from being reachable by the second ground station 108.

In some cases, the outage prediction system 126 receives data from a network service provider 132 about an alternative RF network operating in the first geographical region 106 and/or the second geographical region 108. For instance, the network service provider 132 may be operating a 5G network within the first geographical region 106, and may report a surge in data traffic that creates a corresponding surge in RF interference within the first geographical region.

In various cases, the outage prediction system 126 receives data from a meteorological data provider 134. For example, the meteorological data provider 134 reports weather events impacting the first geographical region 106 and/or the second geographical region 110. In some cases the meteorological data provider 134 reports other types of meteorological events, such as solar flares impacting the satellites 102.

The outage prediction system 126 may predict future outages using the outage report(s) 128, data from the satellite service provider 130, data from the network service provider 132, data from the meteorological data provider 134, or any combination thereof. In some cases, the outage prediction system 126 predicts the future outages using a machine learning (ML) model. As used herein, the term "machine learning," and its equivalents, refers to computer-based techniques for optimizing models by identifying patterns in training data, and applying the optimized models to identify patterns in new data. For instance, the ML model is defined according to various parameters, such as numerical parameters. Various types of ML models can be included or otherwise utilized by the outage prediction system 126, such as Bayesian networks, decision trees, Gaussian processes, neural networks (e.g., convolutional neural networks), regression models, and support-vector machines.

The parameters of the ML model can be adjusted based on training data, such that the ML model is optimized to generate outputs in response to receiving inputs among the training data. The process of optimizing the parameters of the ML model can be referred to as "training" the ML model. Various types of training techniques can be applied to the ML model. For example, the training can be unsupervised, semi-supervised, or supervised. In cases where the ML model performs unsupervised learning, the ML model is trained to identify patterns in the training data, without necessarily fitting the training data into predetermined patterns. If the ML model performs supervised learning, the ML model is trained to transform inputs in the training data into outputs that are also in the training data, such that the model is optimized to fit a portion of the training data into predetermined patterns. In cases where the ML model performs semi-supervised learning, the ML model may be trained to fit at least a portion of the training data into patterns that may at least be partially defined by the training data and/or may be at least partially recognized by the ML model itself.

In some examples, the outage prediction system 126 trains the ML model using previous outage reports reported by various proxies and/or terminals associated with various geographical regions. In some cases, the ML model is further trained based on previous data provided by the satellite service provider 130, the network service provider 132, and the meteorological data provider 134.

Once the ML model is trained, the outage prediction system 126 may identify patterns in the outage report(s) 128, data from the satellite service provider 130, data from the network service provider 132, data from the meteorological data provider 134, or any combination thereof, that are indicative of future outages in the second geographical region 110.

In various implementations, the outage prediction system 126 may indicate at least one future outage in the second geographical region 110 in at least one outage prediction 136. The outage prediction(s) 136, for instance, indicate that a future condition will prevent the second ground station 108 and/or the second terminal(s) 116 from exchanging communication signals with the satellites 102. In some cases, the outage prediction system 126 may indicate at least one of a time, a duration, or a location of the future outage in the second geographical region 110.

According to some cases, the second proxy 118 may take prophylactic actions based on the outage prediction(s) 136 in order to prevent the second terminal(s) 116 from losing services due to the future outage. In some cases, the second proxy 118 can initiate proxy replication in advance of the future outage. In some implementations, the second poxy 118 may begin routing data traffic associated with the second terminal(s) 116 through the terrestrial base station 120, rather than the second ground station 108, in advance of the predicted outage. Thus, the second terminal(s) 116 may receive services using the terrestrial network, rather than experiencing an interruption in services due to the satellite network outage.

Figure 2:
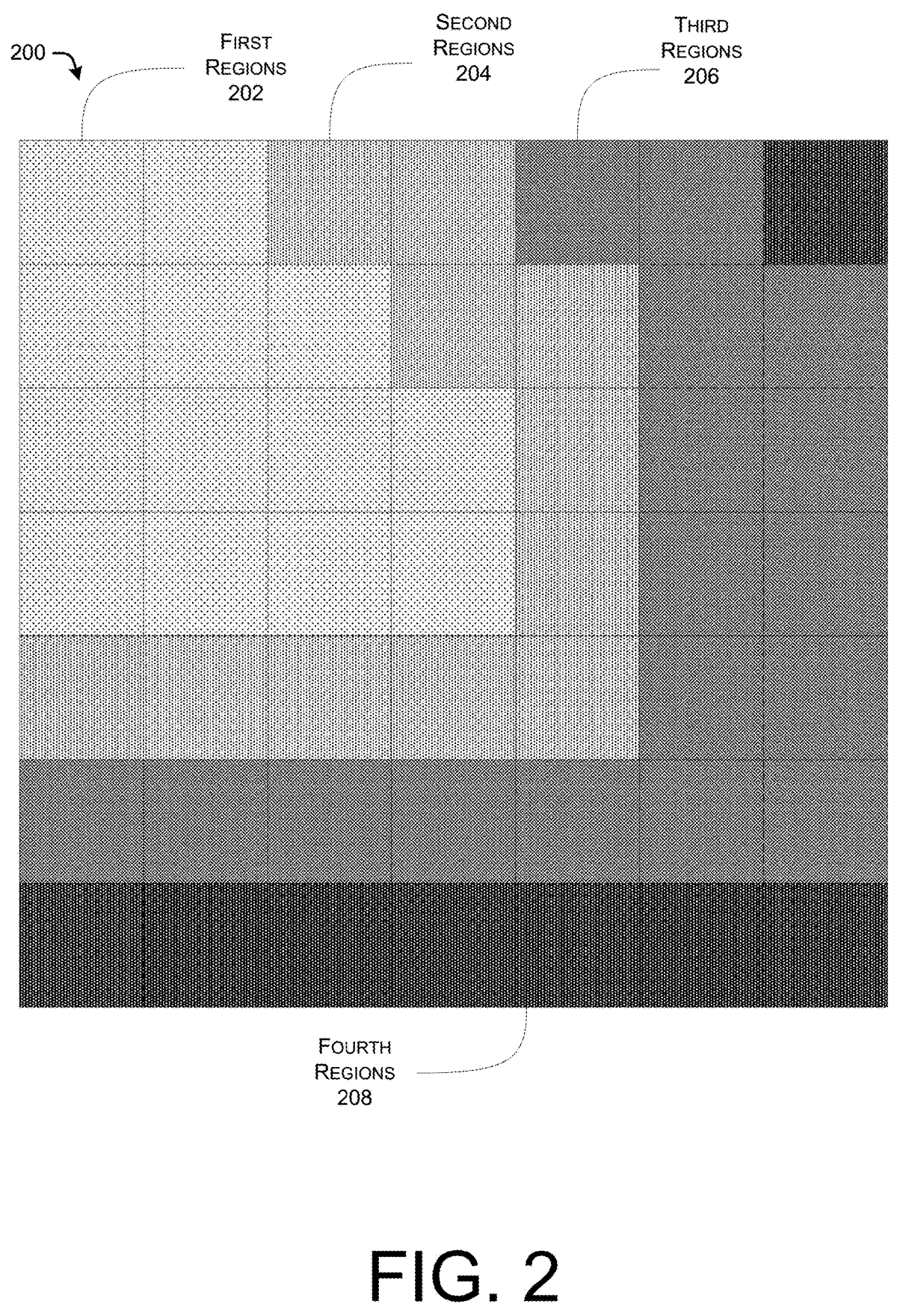

FIG. 2 illustrates an example environment including a grid 200 of geographic regions whose satellite network outages can be predicted in advance. The grid 200, in various cases, can extend along an area of the surface of the earth. Various satellites in the satellite network may be traveling over the area, such that the coverage area of each respective satellite may overlap different regions in the grid 200 at different times. In addition, sources of interference may be traveling over the area, and may block communication between the satellites and ground stations in the different regions in the grid 200 at different times. Accordingly, conditions in the satellite network may translate across the grid 200 in a predictable fashion.

In some implementations, each region of the grid 200 has a consistent area. However, implementations are not so limited. In some cases, individual regions in the grid 200 may be defined by the coverage region of individual ground stations in the area. In some examples, individual regions in the grid 200 are defined as including greater than a threshold number of user terminals, such as ten user terminals. Although the regions of the grid illustrated in FIG. 2 are directly adjacent to one another (e.g., a boundary of one region is the boundary of another, neighboring region), implementations of the present disclosure are not so limited. For example, in some implementations, the grid 200 could include regions that are spaced apart from one another without any regions being disposed between them.

In various implementations, the grid 200 includes various groups of regions representing satellite network outages at different times. For example, first regions 202 may have a satellite network outage at a first time, second regions 204 may have a satellite network outage at a second time, third regions 206 may have a satellite network outage at a third time, and the fourth regions 208 may have a satellite network outage at a fourth time. In various cases, the first regions 202 have an observed outage, whereas the second regions 204, the third regions 206, and the fourth regions 208 are predicted to have outages in the future. That is, a current time may be between the first time and the second time.

Due to the movement of the satellites in the satellite network and/or the movement of other sources of interference in satellite communications, the observed outages in the first regions 202 can be used to predict the future outages in the second regions 204, the third regions 206, and the fourth regions 208. For instance, an outage prediction system (e.g., outage prediction system 126) may receive various reports of terminals and/or ground stations in the first regions 202 that are unable to transmit data to the satellites in the satellite network and/or are unable to receive data from the satellites in the satellite network at the first time. Based on these reports, the outage prediction system may predict the future outages for terminals and/or ground stations in the second regions 204, the third regions 206, and the fourth regions 208. In some cases, the outage prediction system predicts the times at which the outages impact the terminals and/or ground stations in the second regions 204, the third regions 206, and the fourth regions 208.

In various implementations, the outage prediction system minimizes the impacts of the pending outages in the second regions 204, the third regions 206, and the fourth regions 208. In some cases, the outage prediction system causes proxies associated with the second regions 204 to route data traffic associated with terminals in the second regions 204 to an alternate communications network (e.g., a terrestrial network) in advance of the second time. Further, the outage prediction system may cause proxies associated with the third regions 206 to route data traffic associated with terminals in the third regions 206 to the alternate communications network in advance of the third time, and cause proxies associated with the fourth regions 208 to route data traffic associated with terminals in the fourth regions 208 to the alternate communications network in advance of the fourth time. Thus, the terminals in the second regions 204, the third regions 206, and the fourth regions 208 may be prevented from experiencing interruptions in services due to the predicted outages.

In some cases, the alternative communications network may be inferior to the satellite communication network in at least one way. For instance, the alternative communications network may have a higher level of congestion or latency than the satellite communication network. Accordingly, it may be advantageous to minimize routing data traffic to the alternative communications network while the satellite communications network is reachable.

According to some examples, the outage prediction system causes data traffic to be rerouted to the terrestrial network during a predicted outage, but may cause data traffic to be routed to the satellite network shortly before and after a predicted outage. For example, the outage prediction system may cause proxies in the second regions 204 to reroute data traffic to the terrestrial network within less than a threshold time period (e.g., one minute) before the second time occurs. In addition, the outage prediction system may predict the times at which the outages end within the various regions of the grid 200. Accordingly, the outage prediction system can cause proxies in the second regions 204 to route the data traffic to the satellite network less than a threshold time period (e.g., one minute) after the outage in the second regions 204 ends. Thus, the outage prediction system, in various cases, can preferentially cause the terminals in the grid 200 to utilize the satellite network when no outage is predicted, but may cause the terminals in the grid 200 to utilize the terrestrial network when the satellite network is not reachable.

FIG. 3 illustrates an example environment 300 for predicting future satellite network outages based on previous satellite network outages. In various implementations, an outage prediction system 302 gathering input information from reporting proxies 304 associated with first set of terminals 306, predicts future outages impacting a second set of terminals 308 based on the input information, and sends output information to adjusting proxies 310 associated with the second set of terminals 308.

The first set of terminals 306, in various implementations, may determine that they are unable to transmit data to, or receive data from, the satellite network. In various implementations, the first set of terminals 306 communicates, to the reporting proxies 304, information indicating the communication interruptions between the first set of terminals 306 and the satellite network. Individual reporting proxies 304 may receive information from multiple terminals among the first set of terminals 306.

In various cases, the reporting proxies 304 transmit outage reports to the outage prediction system 302. In some cases, the reporting proxies 304 indicate times, durations, and locations of the communication interruptions between the first set of terminals 306 and the satellite network. According to various implementations, individual reports may indicate multiple outages experienced by the first set of terminals 306. Further, in some cases, the reports may anonymize data from the first set of terminals 306. For example, a particular terminal among the first set of terminals 306 may indicate an identifier of the particular terminal and/or a specific location at which the particular terminal experienced an outage. However, the associated reporting proxy among the reporting proxies 304 may omit the identifier and/or include a more general location (e.g., a range of an acre including the specific location) of the particular terminal at the time of the outage. Accordingly, if the reports are intercepted by a malicious party, the malicious party may be prevented from identifying sensitive information about the first set of terminals 306.

The outage prediction system 302 may predict future outages experienced by the second set of terminals 308 based on the reports from the reporting proxies 304. In some cases, the outage prediction system 302 inputs the reports into a ML model that has been trained to identify patterns in the reports associated with future outages. The outage prediction system 302, in some cases, also relies on other sources of data to predict the outages, such as meteorological data, satellite network data, and RF network provider data.

Based on the predicted outages that will impact the second set of terminals 308, the outage prediction system 302 may communicate with the adjusting proxies 310, in order to prevent the second set of terminals 308 from experiencing service interruptions. For instance, the outage prediction system 302 may transmit indications of the predicted outages and/or instructions for rerouting data traffic in advance of the predicted outages. In response to receiving the communications from the outage prediction system 302, the adjusting proxies 310 may reroute data traffic to and from the second set of terminals 308 in advance of the predicted outages. For instance, the adjusting proxies 310 may route the data traffic to and from a terrestrial network, rather than the satellite network. Accordingly, service interruptions at the second set of terminals 308 can be prevented.

FIG. 4 illustrates an example process 400 for preventing serve interruptions in advance of satellite network outages. The process 400 may be performed by an entity, such as a computing device, a processor, one or more servers, a router, an outage prediction system (e.g., the outage prediction system 126 or outage prediction system 302), or any combination thereof.

At 402, the entity receives outage data indicating first outages between first endpoints in a first geographical region and a satellite network. For example, the outage data includes one or more outage reports. The outage data may be generated by the first endpoints and/or a first proxy communicatively coupled to the first endpoints. In some implementations, the outage data is transmitted by the first endpoints and/or the first proxy. In various examples, the outage data includes locations of the first endpoints during the first outages, times of the first outages, durations of the first outages, or any combination thereof.

At 404, the entity predicts, based on the outage data, a second outage to be experienced by a second endpoint in a second geographical region and the satellite network. In some examples, the entity predicts the second outage further based on contextual data. For instance, the contextual data includes RF conditions (e.g., indicating RF signaling utilized by alternative RF networks), weather conditions (e.g., indicating clouds or storms), or satellite network conditions (e.g., indicating inoperative satellites, such as satellites undergoing software updates). In various implementations, the entity trains a ML model based on a first portion of the outage data and/or a first portion of the contextual data. The entity may utilize the trained ML model, a second portion of the outage data, a second portion of the contextual data, or any combination thereof, to predict the second outage. In some cases, the second geographical region borders the first geographical region on the surface of the earth. In various implementations, the first and second geographical regions are part of a grid of geographical regions distributed along the surface of the earth.

At 406, the entity causes data traffic to and/or from the second endpoint to be transmitted over a terrestrial network in advance of the second outage. In various implementations, the entity transmits a message to a second proxy that is communicatively coupled to the second endpoint. The second message indicates the second outage and/or includes an instruction to route data to the terrestrial network.

Figure 5:
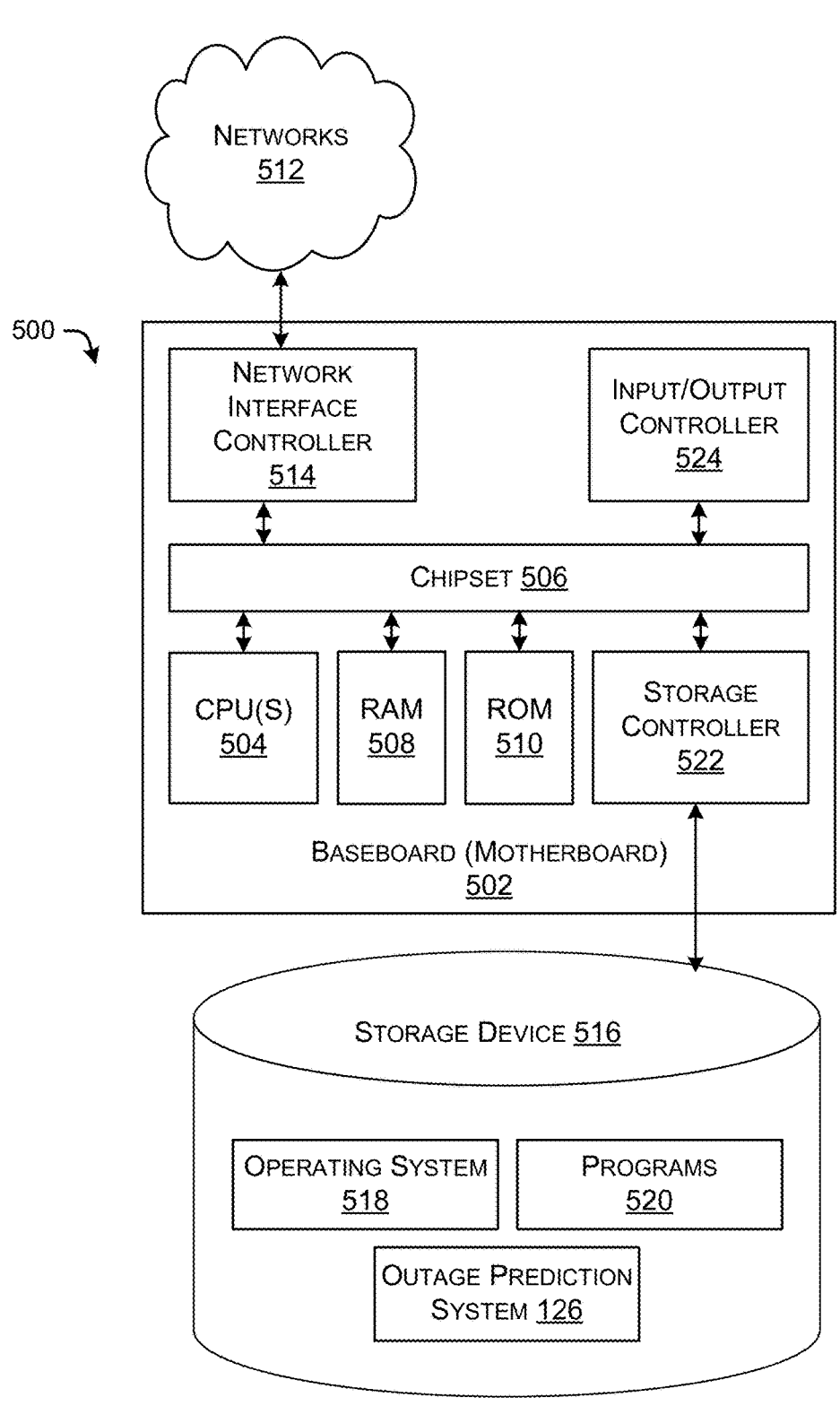
FIG. 5 shows an example computer architecture for a server computer capable of executing program components for implementing various functions described herein.

FIG. 5 shows an example computer architecture for a server computer 500 capable of executing program components for implementing the functionality described above. The computer architecture shown in FIG. 5 illustrates a conventional server computer, workstation, desktop computer, laptop, tablet, network appliance, e-reader, smartphone, or other computing device, and can be utilized to execute any of the software components presented herein. The server computer 500 may, in some examples, correspond to a network node described herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a random-access memory (RAM) 508, used as the main memory in the computer 500. The chipset 506 can further provide an interface to a computer-readable storage medium such as a read-only memory (ROM) 510 or non-volatile RAM (NVRAM) for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through at least one network 512. The chipset 506 can include functionality for providing network connectivity through a network interface controller (NIC) 514, such as a gigabit Ethernet adapter. The NIC 514 is capable of connecting the computer 500 to other computing devices over the network 512. It should be appreciated that multiple NICs 514 can be present in the computer 500, connecting the computer 500 to other types of networks and remote computer systems. In some instances, the NICs 514 may include at least on ingress port and/or at least one egress port.

The computer 500 can be connected to a storage device 516 that provides non-volatile storage for the computer. The storage device 516 can store an operating system 518, programs 520, and data, which have been described in greater detail herein. For instance, the storage device 516 may store instructions for executing the outage prediction system 126. The storage device 516 can be connected to the computer 500 through a storage controller 522 connected to the chipset 506. The storage device 516 can consist of one or more physical storage units. The storage controller 516 can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 500 can store data on the storage device 516 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 516 is characterized as primary or secondary storage, and the like.

For example, the computer 500 can store information to the storage device 516 by issuing instructions through the storage controller 522 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 516 by detecting the physical states or characteristics of one or more particular locations within the physical storage units.

In addition to the mass storage device 516 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by any network node described herein may be supported by one or more devices similar to computer 500. Stated otherwise, some or all of the operations performed by a network node may be performed by one or more computer devices 500 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 516 can store an operating system 518 utilized to control the operation of the computer 500. According to one embodiment, the operating system comprises the LINUX™ operating system. According to another embodiment, the operating system includes the WINDOWS™ SERVER operating system from MICROSOFT Corporation of Redmond, Washington. According to further embodiments, the operating system can comprise the UNIX™ operating system or one of its variants. It should be appreciated that other operating systems can also be utilized. The storage device 516 can store other system or application programs and data utilized by the computer 500.

In one embodiment, the storage device 516 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

As illustrated in FIG. 5, the storage device 516 stores programs 520, which may include one or more processes. The process(es) may include instructions that, when executed by the CPU(s) 504, cause the computer 500 and/or the CPU(s) 504 to perform one or more operations.

The computer 500 can also include one or more input/output controllers 524 for receiving and processing input from a number of input devices, such as a keyboard, a mouse, a touchpad, a touch screen, an electronic stylus, or other type of input device. Similarly, an input/output controller 524 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed by a system, the method comprising:
   receiving outage data indicating first outages experienced by first endpoints in a first geographical region, the first outages comprising interruptions in communication between first satellites and the first endpoints;
   receiving contextual data indicating:
      radio frequency (RF) conditions impacting the first geographical region and a second geographical region;
      weather conditions in the first geographical region and the second geographical region; and
      network conditions associated with a satellite network comprising the first satellites and at least one second satellite;
   predicting, based on the outage data and the contextual data, a future time associated with a second outage comprising an interruption in communication between the at least one second satellite and a second endpoint in a second geographical region; and
   causing the second endpoint to transmit user data over a secondary network in advance of the future time associated with the second outage.

2. The method of claim 1, wherein the outage data is received from at least one proxy connected to the first endpoints.

3. The method of claim 1, wherein the outage data comprises locations of the first endpoints during the first outages, times of the first outages, and durations of the first outages.

4. The method of claim 1, wherein the first satellites comprise at least one Low Earth Orbit (LEO) satellite.

5. The method of claim 1, wherein predicting the second outage comprises:
   training a machine learning model using a first portion of the outage data; and
   in response to training the machine learning model, predicting the second outage based on a second portion of the outage data and the machine learning model.

6. The method of claim 1, wherein the secondary network comprises a terrestrial cellular network.

7. The method of claim 1, wherein causing the second endpoint to transmit user data over the secondary network in advance of the second outage comprises:
   transmitting, to a proxy connected to the second endpoint, an instruction to transmit the user data to the secondary network.

8. The method of claim 1, wherein the contextual data further indicates
   meteorological events impacting the first geographical region and the second geographical region; and
   at least one inoperative satellite among the first satellites and/or at least one second satellite.

9. The method of claim 1, wherein the contextual data further indicates meteorological events impacting the first geographical region and the second geographical region the meteorological events comprising solar flares.

10. A system, comprising
   at least one processor; and
   one or more non-transitory media storing instructions that, when executed by the system, cause the system to perform operations comprising:
      receiving outage data indicating first outages experienced by first endpoints in a first geographical region, the first outages comprising interruptions in communication between first satellites and the first endpoints;
      receiving contextual data indicating radio frequency (RF) conditions impacting the first geographical region and a second geographical region, weather conditions in the first geographical region and the second geographical region, or network conditions associated with a satellite network comprising the first satellites and at least one second satellite;

predicting, based on the outage data and the contextual data, a second outage comprising an interruption in communication between the at least one second satellite and a second endpoint in a second geographical region; and in response to predicting the second outage and prior to the second outage, transmitting, to a proxy communicatively coupled to the second endpoint, a message indicating the second outage.

11. The system of claim 10, wherein the outage data is received from at least one proxy connected to the first endpoints.

12. The system of claim 10, wherein the outage data comprises locations of the first endpoints during the first outages, times of the first outages, and durations of the first outages.

13. The system of claim 10, wherein the first satellites comprise at least one Low Earth Orbit (LEO) satellite.

14. The system of claim 10, wherein predicting the second outage comprises:

training a machine learning model using a first portion of the outage data; and in response to training the machine learning model, predicting the second outage based on a second portion of the outage data and the machine learning model.

15. The system of claim 10, wherein the message indicating the second outage comprises an instruction to transmit user data associated with the second endpoint over a terrestrial network, rather than the satellite network.

16. The system of claim 15, wherein the terrestrial network comprises a cellular network.

17. An outage prediction system, comprising:

at least one processor; and memory storing instructions that, when executed by the at least one processor, cause the at least one processor to perform operations comprising:

receiving outage data indicating first outages experienced by endpoints disposed in a grid of geographical regions, the first outages comprising interruptions in communication between a satellite network and the endpoints, the satellite network comprising low earth orbit (LEO) satellites;

receiving contextual data indicating radio frequency (RF) conditions in the geographical regions, weather conditions in the geographical regions, and network conditions associated with the satellite network;

predicting, based on the outage data and the contextual data, a second outage comprising an interruption in communication between the satellite network and a particular endpoint among the endpoints, the particular endpoint being in one of the geographical regions; and in response to predicting the second outage, transmitting, to a proxy communicatively coupled to the particular endpoint, an instruction to route data associated with the particular endpoint over a terrestrial cellular network in advance of the second outage.

18. The system of claim 17, wherein the first outages are experienced by at least one of the endpoints in a first geographical region among the geographical regions, wherein the second outage is predicted to impact the particular endpoint in a second geographical region among the geographical regions, and wherein the first geographical region borders the second geographical region.

19. The system of claim 17, wherein predicting, based on the outage data and the contextual data, the second outage comprising the interruption in communication between the satellite network and the particular endpoint comprises:

training a machine learning (ML) model based on a first portion of the outage data and a first portion of the contextual data;

in response to training the ML model, predicting the second outage based on the ML model, a second portion of the outage data, and a second portion of the contextual data.

20. The system of claim 17, wherein the first outages and the second outage are caused by at least one of:

an inoperative LEO satellite among the LEO satellites; or a weather pattern moving across the geographical regions.

* * * * *